United States Patent [19]

Stjärne

[11] Patent Number: 5,277,280
[45] Date of Patent: Jan. 11, 1994

[54] THRUST FORCE TRANSMISSION DEVICE AT A BRAKE ACTUATOR

[75] Inventor: Anders O. G. Stjärne, Löddeköpinge, Sweden

[73] Assignee: Sab Wabco AB, Sweden

[21] Appl. No.: 848,102

[22] Filed: Mar. 9, 1992

[30] Foreign Application Priority Data

Mar. 11, 1991 [SE] Sweden .................................. 9100717

[51] Int. Cl.$^5$ ............................................ F16D 65/14
[52] U.S. Cl. ....................................... 188/217; 92/129;
188/74; 188/153 R; 188/206 R; 403/58;
403/121; 403/149
[58] Field of Search ................... 188/153R; 188/153D;
188/51; 188/53; 188/54; 188/55; 188/72.2;
188/206R; 188/74, 188/217

[56] References Cited

U.S. PATENT DOCUMENTS

| 189,436 | 4/1877 | Eads | 403/58 X |
|---|---|---|---|
| 259,006 | 6/1882 | Guernsey | 188/153 R |
| 403,277 | 5/1889 | Lawrence | 188/153 R |
| 1,746,045 | 2/1930 | McGowan | 188/206 R |
| 2,591,624 | 4/1952 | Siebels | 403/58 X |
| 2,666,506 | 1/1954 | Bachman | 188/206 R |
| 2,976,956 | 3/1961 | Behles | 188/72.2 X |
| 3,832,073 | 8/1974 | Castellanos | 403/121 |
| 4,287,968 | 9/1981 | Stensson et al. | 188/153 R X |
| 4,630,714 | 12/1986 | Stjarne et al. | 188/206 R |
| 5,062,505 | 11/1991 | Stjarne et al. | 188/206 R |

FOREIGN PATENT DOCUMENTS

| 471733 | 2/1951 | Canada | 188/206 R |
|---|---|---|---|
| 1140488 | 1/1969 | United Kingdom . | |
| 1220903 | 1/1971 | United Kingdom | 403/58 |

Primary Examiner—George E. A. Halvosa
Attorney, Agent, or Firm—Laurence R. Brown

[57] ABSTRACT

Brake force is transmitted between a single axially movable push rod (6) and a brake block holder (3) by an intermediate force transmission member (22) to accommodate for movements along the wheel axis. This intermediate member (22) has cylindrical surfaces cooperating with both the block holder and the push rod end. The cylindrical surface (22') of the member (22), which cooperates with the brake block holder portion (21), is arcuate with its circle center coinciding with the center for the cylindrical push rod end (6'). A shackle (24) held on the brake block holder is biassed by springs (28) forward toward a brake application direction to retain and frictionally engage protrusions (23) extending from the actuator push rod (6).

4 Claims, 3 Drawing Sheets

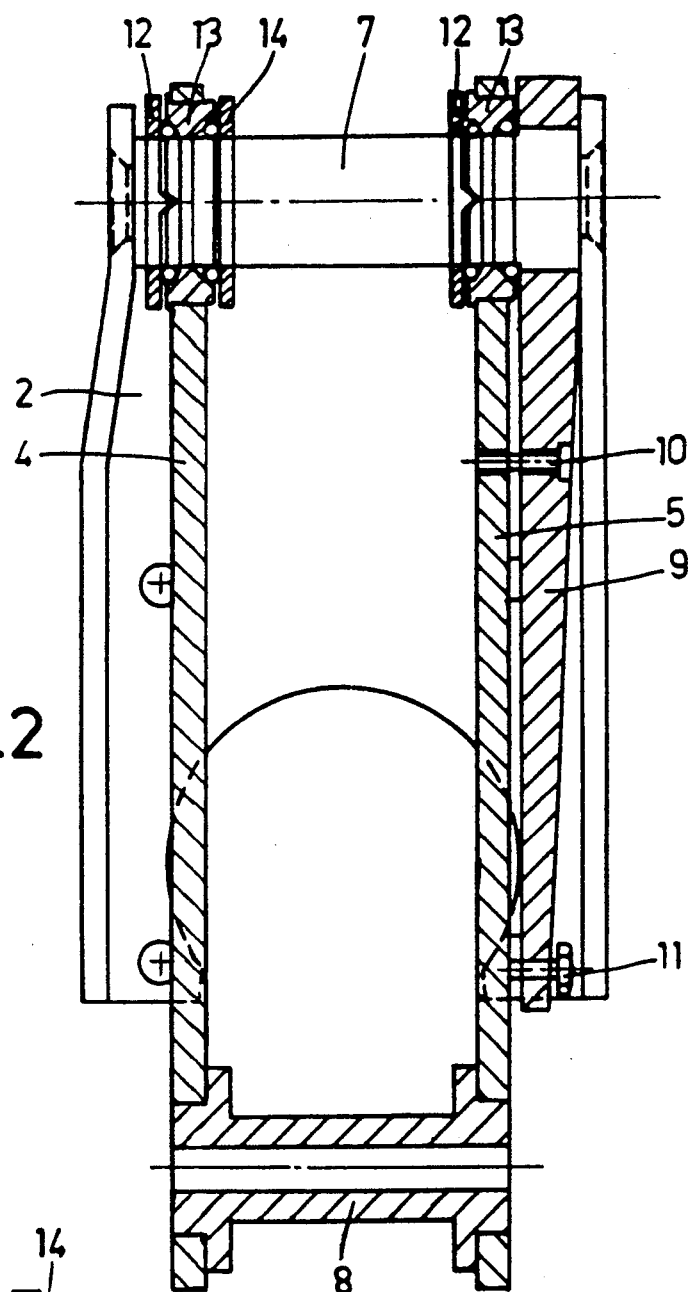
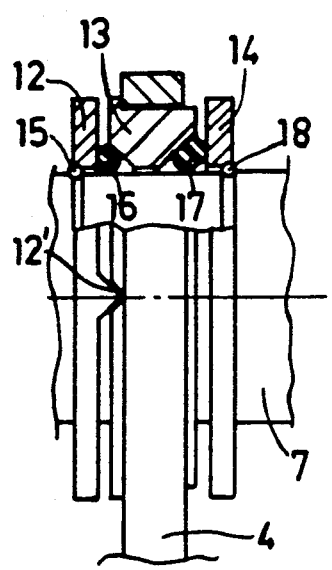

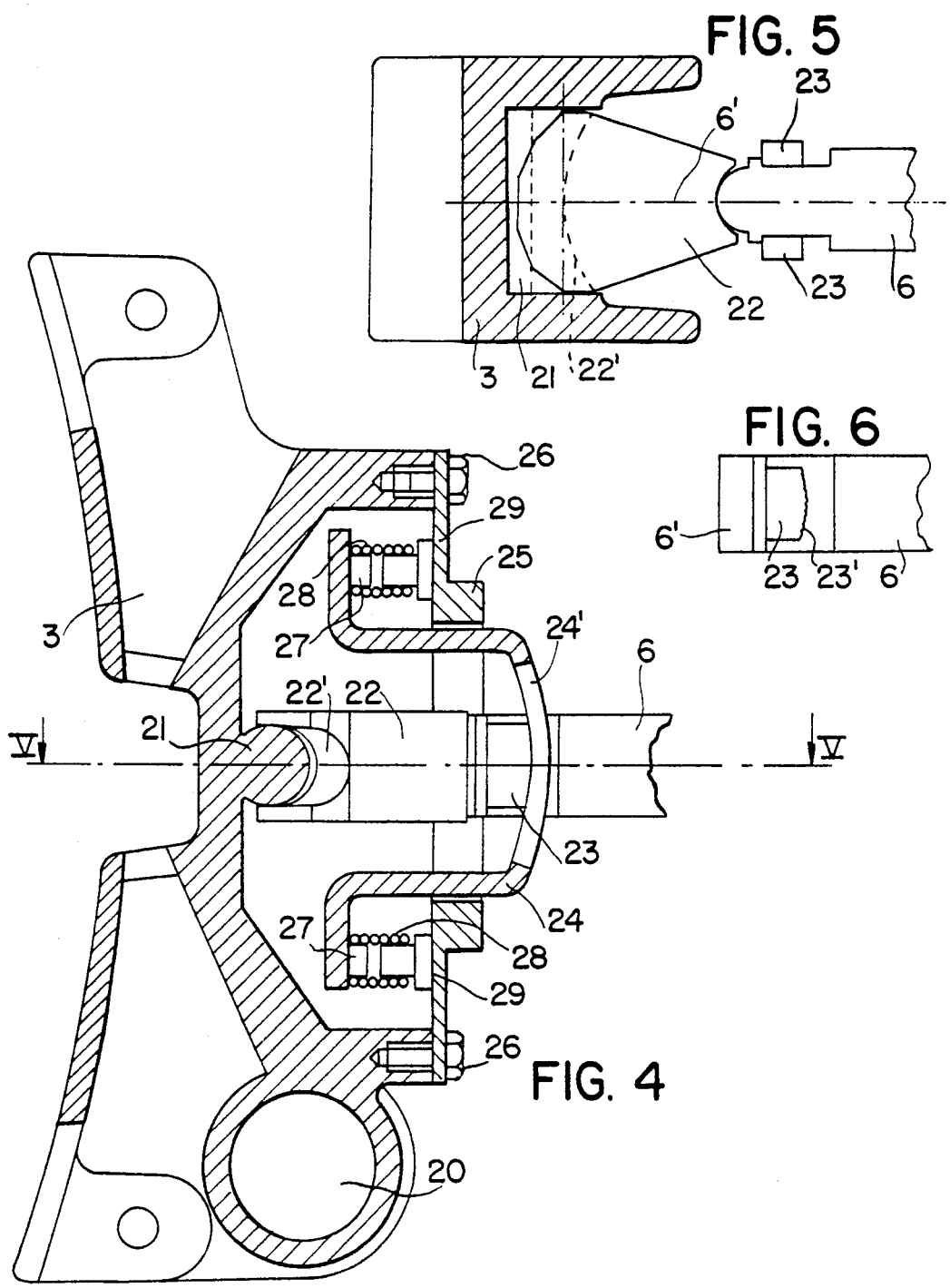

5,277,280

THRUST FORCE TRANSMISSION DEVICE AT A BRAKE ACTUATOR

TECHNICAL FIELD

This invention relates to a device at a brake actuator (preferably but not exclusively for a rail vehicle) for thrust force transmission by means of a separate force transmission member between an axially movable push rod of the brake actuator and a brake block holder movable out of line with the push rod.

BACKGROUND OF THE INVENTION

Normally a brake block holder, which may be suspended from a bracket on the brake actuator, moves along an arc with a big radius but otherwise in line with the push rod. In such a case the force transmission can be accomplished by simple means, for example by an edge and recess arrangement as shown in GB-B-1 140 488, allowing the necessary sliding relative movement.

If the brake block holder is also laterally movable in relation to the push rod, which is the case in certain recent designs allowing the brake block holder to follow axial movements of a wheel or wheel-set, the force transmission problem has to be solved in other ways. One typical example of such a solution is shown in U.S. Pat. No. 4,287,968, where there is a separate force transmission member with certain properties between the push rod and the brake block holder. This publication is taken as the closest prior art.

Although this latter prior art solution has great advantages and has proven commercially successful, it does not give perfect force transmission without transverse force components at the arcuate movements of the brake block holder.

THE INVENTION

An improved solution without any side force components is according to the invention attained in that the single force transmission member is arranged between a transverse cylindrical portion in the brake block holder and a cylindrical push rod end perpendicular to said portion and has cylindrical surfaces cooperating with said portion and end, respectively, wherein the cylindrical surface of the member cooperating with said portion is arcuate with its circle center coinciding with the center for the cylindrical push rod end.

Although the push rod end may most naturally be convexly cylindrical and the cylindrical portion in the brake block holder be in the form of a shaft, these two elements may—within the scope of the invention—be cylindrical recesses.

In a practical embodiment to be described below the brake block holder is pivoted at its lower end, but a device according to the invention may equally well be used when the brake block holder is centrally pivoted.

In order to keep the members together the brake block holder and the force transmission member are spring biassed against the push rod. In a preferred embodiment of the invention this is obtained in that a shackle biassed by springs forwards in a brake application direction relative to a back cover on the brake block holder engages protrusions on the actuator push rod. Alternatively the shackle can extend through an opening in the push rod provided with teeth or friction surfaces.

In the embodiment where the brake block holder is pivoted at its lower end this spring biassed shackle serves to keep the brake block holder in a substantially vertical position or the position afforded to it at the latest brake application.

This important object of the spring biassed shackle is further improved in that the push rod protrusions and shackle legs cooperating therewith have corresponding toothed or friction surfaces, so that a well defined and sure position for the brake block holder is maintained, independently of shocks and vibrations, until the brake block holder is given a new position at a brake application.

According to a further feature of the invention compression springs are arranged on knobs attached to the shackle and on studs having a certain play relative to the knobs, so that a firm mechanical contact can be established when need arises.

The shackle preferably extends through the brake block cover with only a small play so as to receive guiding therefrom.

BRIEF DESCRIPTION OF THE DRAWINGS

The invention will be described in further detail below reference being made to the accompanying drawings, in which;

FIG. 2 is a partly sectional view from the left in FIG. 1 of only parts of the brake block holder arrangement (and with the brake block holder itself omitted), FIG. 3 is a detail view to a larger scale of the upper left hand part of FIG. 2, FIG. 4 is a partly sectional side view of the brake block holder in the arrangement shown in FIG. 1, FIG. 5 is a view substantially along the line V—V in FIG. 4, and FIG. 6 is a side view of a brake unit push rod, also shown in FIGS. 4 and 5.

DETAILED DESCRIPTION OF A PREFERRED EMBODIMENT

Figure 1:
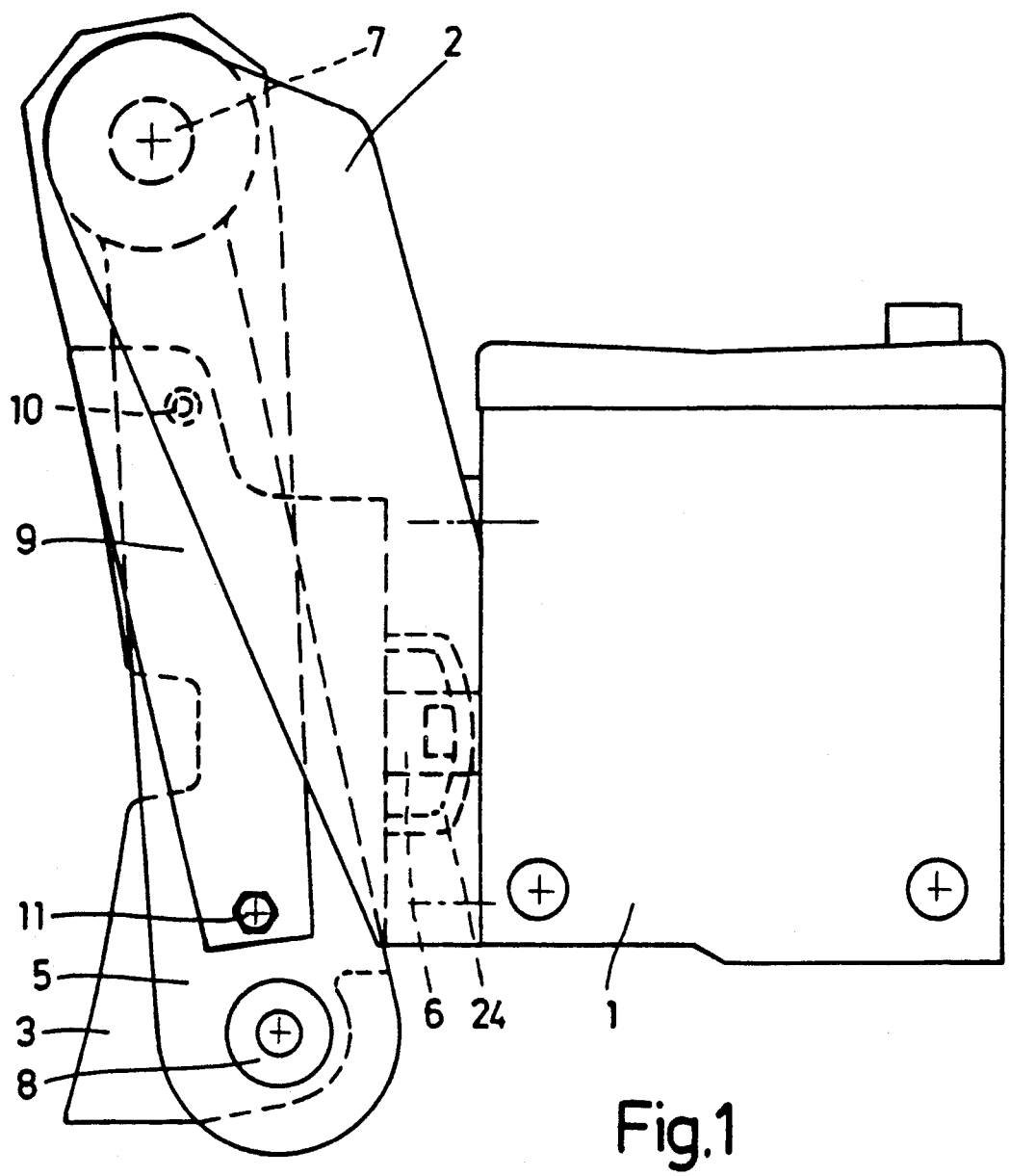
FIG. 1 is a side view of a rail vehicle brake unit with a brake block holder arrangement according to the invention.

A conventional brake actuator 1 forming no part of the present invention and normally including a brake cylinder and a slack adjuster (so as to form a brake unit) is provided with a mounting bracket 2 in the general form of an open-sided casing. The bracket is attached to the brake actuator 1 by means of screws (which are only indicated in FIG. 1).

Without going into details at this stage, a brake block holder 3 is suspended in two hangers 4, 5 rotatably attached to the bracket 2 at their respective upper ends and to the lowermost part of the brake block holder 3 at their lower ends. The brake block holder 3 is centrally actuated by an outgoing push rod 6 of the brake actuator 1.

Each hanger 4, 5 consists of one leaf spring and is thus deflectable. In a way to be described below the hangers are pivotally suspended from an upper shaft 7, which is rotatably mounted in the bracket 2. The hangers 4, 5 are connected at their lower ends by a lower shaft 8, on which the brake block holder 3 is rotatably mounted.

Immediately to the right of the right hanger 5 in FIG. 2 there is a rigid flat bar 9, which is also arranged on the upper shaft 7. This flat bar 9 is arranged at the same side of the arrangement as the wheel flange of the wheel that the brake block attached to the brake block holder 3 is to brakingly cooperate with. The flat bar 9 limits the movements of the hangers 4, 5 to the right in FIG. 2, whereas they can deflect to the left, where there is space afforded by the bracket 2.

As the flat bar 9 is arranged at the wheel flange, a similar arrangement placed at the other side of the vehicle has to be inverted.

The right hanger 5 and the bar 9 are connected for rotational movements together by means of a pin 10. A screw 11 in the lower end of the bar 9 contacting the hanger 5 serves as a means for adjusting the prestress in the hanger 5 and also (by the shaft 8) the hanger 4. (A rest position for the hangers 4, 5 will of course hereby be defined.)

The pivot joints between the hangers 4, 5 and the shaft 7 will now be described with reference to FIG. 2 but more particularly FIG. 3, which to a larger scale shows the joint between the left hanger 4 and the upper shaft 7.

The joint consists of the following main parts: a left support washer 12, a bushing 13 secured to the hanger 4, and a right support washer 14. This right washer 14 is lacking in the right joint for the hanger 5, where its function is taken over by the bar 9.

A locking ring 15 is arranged to the left of (or outside) the left support washer 12 in a circumferential groove in the shaft 7. The edges of the bushing 13 facing the shaft 7 are slanted as shown. A rubber O-ring 16 with somewaht smaller cross-sectional diameter is arranged at the left hand side of the bushing 13 and a rubber O-ring 17 with somewhat larger cross-sectional diameter at the right hand side of the bushing 13, where the slant is somewhat larger. The joint is held together by the right support washer 14 (only to the left in FIG. 2) and secured under prestress by a further locking ring 18 to the right of this washer 14.

The three elements 13, 16, 17 can alternatively be combined into one rubber ring.

The left hand support washer 12 is provided with an edge 12' cooperating with a corresponding recess in the bushing 13 so as to provide a pivot point for the hanger 4 (or the hanger 5 in the right joint).

The described joints will allow the hangers 4 and 5 to freely rotate or swing and pivot in the direction for applying a brake block on a wheel tread and in the direction for following a side-ways motion of the wheel to the left in FIG. 2. The joint is simple and comparatively cheap, but yet it is well protected.

Reference is now made primarily to FIG. 4 but also FIGS. 5 and 6. FIG. 4 is a side view of the brake block holder 3, which has a through hole 20 at its lower end, for its rotatable mounting to the lower shaft 8 (FIG. 2). The brake block holder is designed to releasably receive a brake block (not shown) to the left in FIG. 4 for braking cooperation with the tread of a wheel.

From the description above it is clear that the brake block holder 3 is movable side-ways (i.e. perpendicularly to the plane of the drawing) under the influence of the axial movements of the wheel (or wheelset) during braking, but also that it will have an arcuate application movement about the shaft 7, from which the brake block hangers 4, 5 are suspended. The means transmitting the brake force from the stationary brake actuator 1 to the movable brake block holder 3 have to accommodate these movements. Further, means must be provided to keep the brake block holder 3 in a substantially vertical position but allow it to follow the movements of the wheel. The inventive means to accomplish all this shall now be described.

The solely axially movable push rod of the brake actuator 1 has the designation 6 and is to apply its push force centrally on the brake block holder, which for this purpose is provided with a transverse, cylindrical portion 21. A force transmitting member 22 is arranged between the push rod 6 and the cylindrical portion 21. The push rod 6 has a cylindrical end 6' perpendicular to the cylindrical portion 21, as appears from FIG. 5. The force transmitting member 22 has a cylindrical recess for cooperation with this push rod end 6'. As appears from FIG. 5, the maximum width of the force transmitting member 22, which tapers towards its end in contact with the push rod 6, corresponds to the internal width between the sidewalls of the brake block holder 3, which means that the member 22 is always guided irrespective of its angular position.

The left end of the force transmission member 22 cooperating with the cylindrical portion 21 has a cylindrical recess 22' with a radius corresponding to that of the portion 21. As appears both from FIG. 4 and FIG. 5 in two views, this cylindrical recess 22' has an arcuate shape with its center coinciding with the center for the cylindrical push rod end 6'. By this arrangement all the possible relative movements between the brake actuator push rod 6 and the brake block holder 3 may be accommodated with full brake force transmission capacity.

The push rod 6 is towards its end provided with a protrusion 23 at each side. Each protrusion 23 has a curved toothed side 23' facing from the push rod end 6'. Each such toothed side 23' cooperates with a correspondingly toothed surface on a leg 24' of a shackle 24 straddling the push rod 6. This shackle 24 extends through and receives guiding from a cover 25 attached to the back of the brake block holder 3 by means of screws 26.

At its two ends inside the cover 25 the shackle 24 is provided with knobs 27 for compression springs 28 on studs 29 supported by the cover 25. By means of this spring-biassed shackle 24 the brake block holder 3 will be held in a substantially vertical position or the position given it at the latest brake application, but the brake block holder 3 will be free enough to adopt the position forced upon it by the wheel with which its brake block cooperates. The shackle 24 also keeps the force transmitting parts 6, 22 and 21 together at all times.

The distance between each knob 27 and stud 29 is relatively small, so that undesired movements of the push rod 6, for example at manual resetting of the slack adjuster in the brake actuator 1, are prevented.

The same distance and the distance or play between the shackle 24 and the cover 25 will have the result that the brake block holder 3 can accommodate smaller wheel movements during braking without adjustments of the relative positions of the elements 23 and 24', so that unnecessary wear of the toothed surfaces is avoided. Also a dampening effect on external vibrations is attained.

By means of the arrangement with the shackle 24 such a connection between the brake actuator 1 and the brake block holder 3 is obtained that no separate return spring for the latter is normally required.

I claim:

1. A device at a brake actuator for thrust force transmission by means of a separate force transmission member (22) between an axially movable single push rod (6) of the brake actuator (1) and a brake block holder (3) movable out of line with the push rod, characterized in that the separate force transmission member (22) is arranged between a transverse cylindrical portion (21) in the brake block holder (3) and a cylindrical push rod end (6') penpendicular to said portion and has cylindrical surfaces cooperating with said portion (21) and end (6'), respectively, wherein the cylindrical surface (22') of the member (22) cooperating with said portion (21) is arcuate with its circle center coinciding with the center of the cylindrical push rod end (6'); the brake block holder (3) and the force transmission member (22) are spring biassed against the push rod (6); and a shackle (24) is biassed by springs (28) forward in a brake application direction relative to a back cover (25) on the brake block holder (3) to engage protrusions (23) on the actuator push rod (6).

2. A device according to claim 1, wherein the shackle (24) has cooperating legs (24') characterized in that the actuator push rod protrusions (23) and shackle legs (24') cooperating therewith have corresponding toothed or friction surfaces.

3. A device according to claim 1, characterized in that compression springs (28) are arranged on knobs (27) attached to the shackle (24) and on studs (29) having a certain play relative to the knobs (27).

4. A device according to claim 1, characterized in that the shackle (24) extends through the brake block holder cover (25) with a small play so as to receive guiding therefrom.

* * * * *